United States Patent [19]

Sumiyoshi et al.

[11] Patent Number: 5,062,046
[45] Date of Patent: Oct. 29, 1991

[54] MULTIPLE PROCESSOR SYSTEM HAVING A CORRESPONDENCE TABLE FOR TRANSFERRING PROCESSING CONTROL BETWEEN INSTRUCTION PROCESSORS

[75] Inventors: Takashi Sumiyoshi, Yokohama; Shigekatsu Takahashi, Ayase; Shoji Yamamoto, Chigasaki; Kazuyoshi Negishi, Yokohama; Masaaki Iwasaki, Hachioji, all of Japan

[73] Assignee: Hitachi, Ltd., Tokyo, Japan

[21] Appl. No.: 496,327

[22] Filed: Mar. 20, 1990

[30] Foreign Application Priority Data

Mar. 20, 1989 [JP] Japan .................................. 1-65846

[51] Int. Cl.$^5$ .................................................. G06F 3/06
[52] U.S. Cl. ........................................ 364/200; 364/133;
          364/229.3; 364/229.5; 364/230; 364/228
[58] Field of Search ............................ 364/200, 900

[56] References Cited

U.S. PATENT DOCUMENTS

| | | | |
|---|---|---|---|
| 4,484,270 | 11/1984 | Quernemoen | 364/200 |
| 4,636,947 | 1/1987 | Ward | 364/200 |
| 4,652,940 | 3/1988 | Sumiyoshi et al. | 364/200 |
| 4,733,349 | 3/1987 | Sumiyoshi et al. | 360/5 |
| 4,816,989 | 3/1989 | Fin et al. | 364/200 |

Primary Examiner—Michael R. Fleming
Assistant Examiner—Andrew F. Bodendorf
Attorney, Agent, or Firm—Antonelli, Terry, Stout & Kraus

[57] ABSTRACT

A multiple processor system composed of a plurality of instruction processors allows a plurality of its subsystems for performing data processing in each unit to be operable simultaneously with and parallel to each other in each of the instruction processors. The multiple processor system has a processor designation table and a control processing subsystem. As the processor designation table specifies correspondence relation between a subsystem accessing to each input-output resource and the instruction processor executing the subsystem, the processing control subsystem transfers control of the processing to the instruction processor to be designated by the processor designation table in accordance with the subsystem to be used with reference to the processor designation table during execution of the data processing.

8 Claims, 10 Drawing Sheets

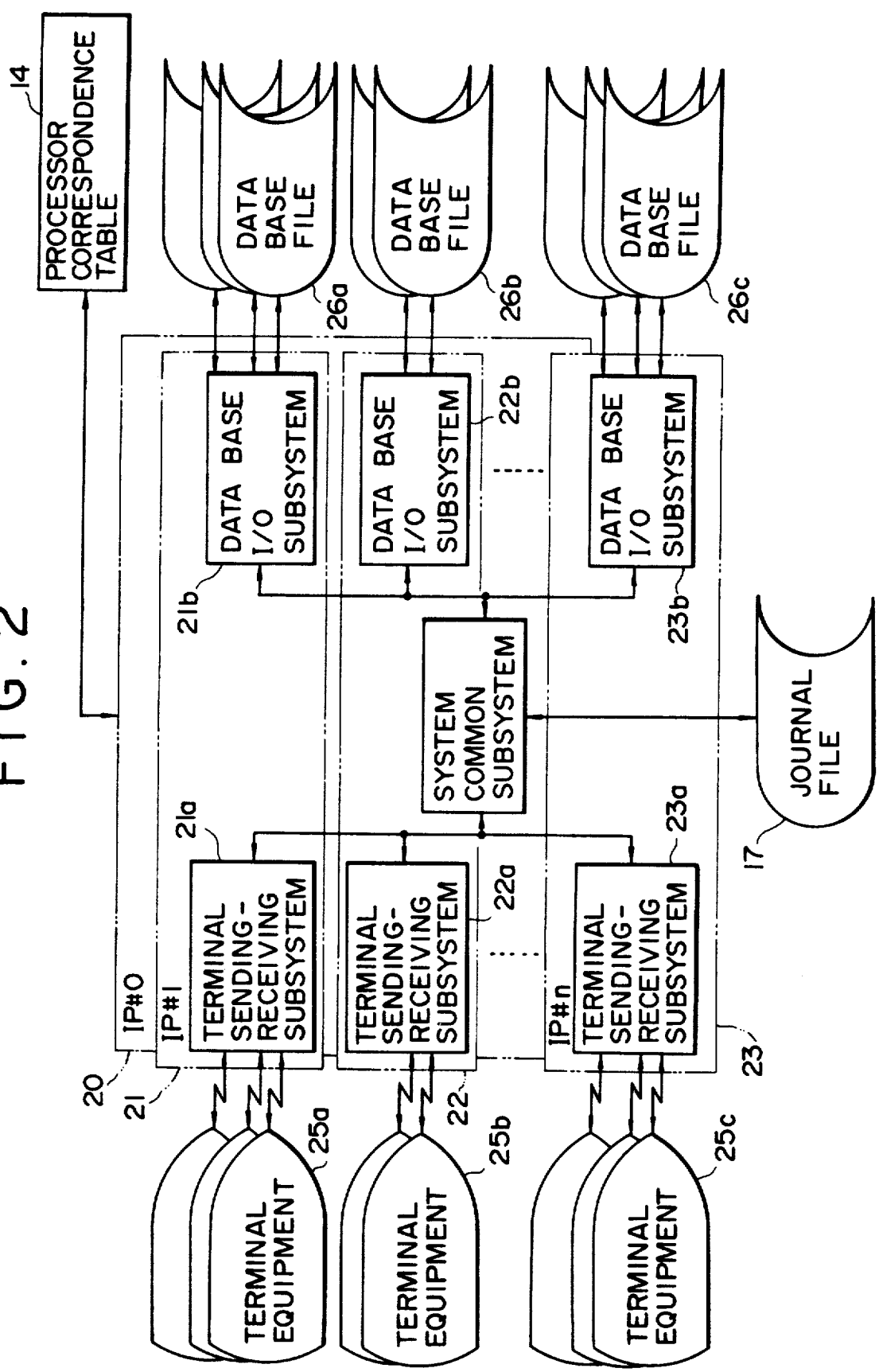

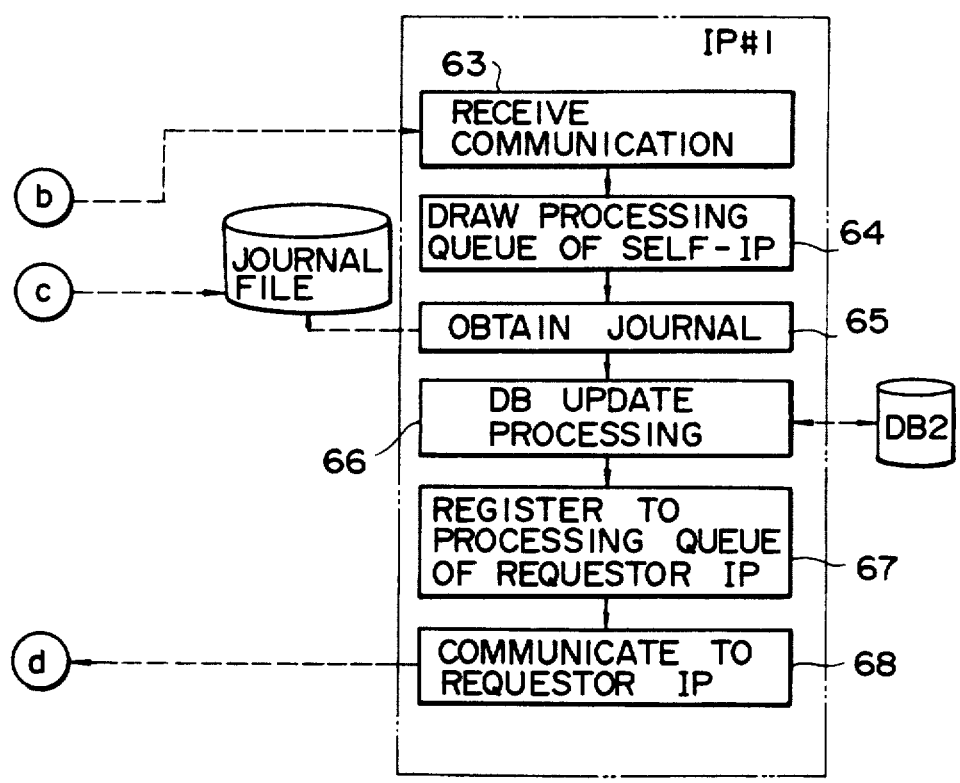

MULTIPLE PROCESSOR SYSTEM HAVING A CORRESPONDENCE TABLE FOR TRANSFERRING PROCESSING CONTROL BETWEEN INSTRUCTION PROCESSORS

BACKGROUND OF THE INVENTION

The present invention relates to a multiple processor system and, more particularly, to a multiple processor system composed of a plurality of instruction processors, wherein a plurality of processes for data processing are efficiently performed simultaneously with and in parallel to each other with improved throughputs of the processing in an environment where the plurality of instruction processors are operable simultaneously with and in parallel to each other.

In order to improve throughputs of data processing in correspondence with an increasing need for data processing, computer systems have been developed from a data processing system in which the data processing is performed with a single instruction processor to a larger-scale multiple processor system composed of a plurality of instruction processors. Such a multiple processor system is provided with a plurality of instruction processors in such a manner that they are operable simultaneously with and in parallel to each other.

In the multiple processor environment composed of a plurality of instruction processors, unlike a single processor environment, a conflict may occur among resources including a memory shared between istruction processors in executing the processing. Once a conflict between resources occurs, the queue time of the resource required by the processors may become longer so that the full capability of each processor cannot be employed to a sufficient extent. Therefore, a processing operation is required which can minimize conflict between resources in order to take advantage of the ability of the processor to its full extent in the multiple processor environment.

In order to achieve a desired throughput in a multiple processor environment with conflict between resources being avoided in executing a plurality of data processings simultaneously and in parallel to each other, conventional operation methods for control of the data processing may be carried out by a processing control, for example, by methods such as:

(1) a method of dynamically determining the relation of a plurality of instruction processors to a plurality of data processings on the basis of the buoy or idle state of an instruction processor (processing in a unit of a task or process); and (2) a method of executing a particular data processing with a particular instruction processor (processing in a unit of a job).

It is to be noted, however, that these two data processing methods have paid no attention to conflict between resources which are used in common by each instruction processor such as a memory in executing a plurality of data processings simultaneously and in parallel to each other in a multiple processor environment in which a plurality of instruction processors are provided. Therefore, these methods cannot take advantage of the full ability of the multiple processors. More specifically, when input-output resources such as terminal equipment and a magnetic tape unit are shared in performing a plurality of data processings, these conventional data processing methods also share data in a memory such as a buffer memory or a table memory required for input and output so that conflict for use of the memory may be likely to occur between the plural instruction processors, thereby failing to improve the throughputs of the processing.

SUMMARY OF THE INVENTION

The present invention has the object to provide a multiple processor system capable of performing a plurality of processes of data processing simultaneously with and in parallel to each other, thereby improving the throughputs of the processing.

The present invention has another object to provide a method for data processing which is adapted to minimize a conflict in the use of a resource such as a memory between a plurality of instruction processors and to take advantage of the processing ability of the multiple processor to a maximized extent.

In order to achieve these objects, the present invention consists of a multiple processor system in which a plurality of subsystems for performing each unit processing of data processing are operable simultaneously with and in parallel to each other in a multiple processor system having a plurality of instruction processors, comprising:

a processor correspondence table for indicating a relation between each subsystem for accessing each input-output resource and an instruction processor for controlling the subsystem; and a control processing means for transferring processing control to the instruction processor designated by the processor correspondence table in accordance with the subsystem to be used during execution of the data processing.

In performing control of the data processing in the multiple processor system, plural subsystems are provided which perform each of the unit processing of the input-output processing in correspondence with each of the plural input-output resources for implementing a respective input-output operation, and the correspondence relation between the subsystem and the instruction processor executing the subsystem is specified by the processor correspondence table and the control processing for transferring the processing control to the instruction processor designated by the processor correspondence table is performed in accordance with the subsystem to be used by the control processing means upon execution of the process when the data processing is executed. The processor correspondence table specifies the relation of the processor to a subsystem in such a manner, for example, that the subsystem for accessing the terminal equipment and the subsystem for accessing a particular data base file having a high frequency in which the terminal equipment is accessed are processed by the same instruction processor.

More particularly, the multiple processor system is provided with a processor designation table and a control effecting means for processing the transfer of control to each instruction processor. The processor designation table is provided with data indicating the correspondence between each subsystem for accessing each of the input-output resources and the instruction processor which is designated for executing the subsystem. The subsystem referred to herein is intended to represent a process for performing each of the unit processing of the data processing in a multiple processor system composed of a plurality of the instruction processors. In the multiple processor system, the plural subsystems of this process are operated concurrently with and in parallel to each other. The control processing means performs a control processing for transferring the processing control to an instruction processor to be designated by the processor correspondence table with reference to the processor correspondence table in accordance with the subsystem to be used upon execution of the data processing.

As described hereinabove, in implementing control of the data processing in the multiple processor system, a plurality of subsystems are generated for performing each of the unit processing for access in correspondence with each of the plural input-output resources, and the relation of a subsystem to a processor is designated in the processor correspondence table in order to specify the relation between the subsystem and the instruction processor executing the subsystem. When the data processing is executed, the control processing is performed by the control processing means for transferring the processing control to the instruction processor to be designated by the processor correspondence table in accordance with the subsystem to be used by execution of the process.

This arrangement allows the entire system to be divided into business subsystems for accessing each input-output resource in correspondence with the input-output resource, such as terminal equipment, a magnetic disc unit or the like, to be used in the data processing, during concurrent and parallel execution of plural data processings, thereby generating each subsystem. In order to identify the processor which corresponds to each of the subsystems, the executing instruction processor is specified by the processor correspondence table, so that data in the memory, such as a buffer or table, required for accessing the input-output resource specifies the instruction processor to be used, thereby reducing a conflict between the instruction processors.

By assigning each of plural data processings subsystems which use the input-output resources such as terminal equipment, magnetic disc units and so on to an instruction processor in a processing unit accessing the input-output resource in correspondence with the input-output resource, access to a particular input-output resource is executed by a particular instruction processor. Therefore, the probability of causing a conflict among the plural instruction processors in connection with data in the memory, such as buffers, tables and so on, required for input-output processing can be reduced to a significant extent.

The access processing to the input-output resources is a process which mostly causes interference with processes of other data processing to occur upon execution of processes of the data processing in the multiple processor system, and the data processing method as described hereinabove can minimize such a memory conflict between the instruction processors, thereby improving the throughput of the processing and the system performance.

The processor correspondence table specifies the relation between each subsystem and a processor in such a manner that the subsystem for accessing the terminal equipment is processed with the same instruction processor as the subsystem for accessing the particular data base file having a high frequency in which the terminal equipment is accessed. This construction can reduce the overhead of processing communication between the instruction processors to be used for execution of the processes by allowing each processing to be executed by the same instruction processor when the search processing and the update processing of a particular data base file is implemented from the terminal equipment. This can improve processing throughput and system performance.

BRIEF DESCRIPTION OF THE DRAWINGS

FIG. 2 is a block diagram illustrating the system configuration of an essential portion of a multiple processor system according to another embodiment of the present invention.

DESCRIPTION OF THE PREFERRED EMBODIMENTS

Figure 1:
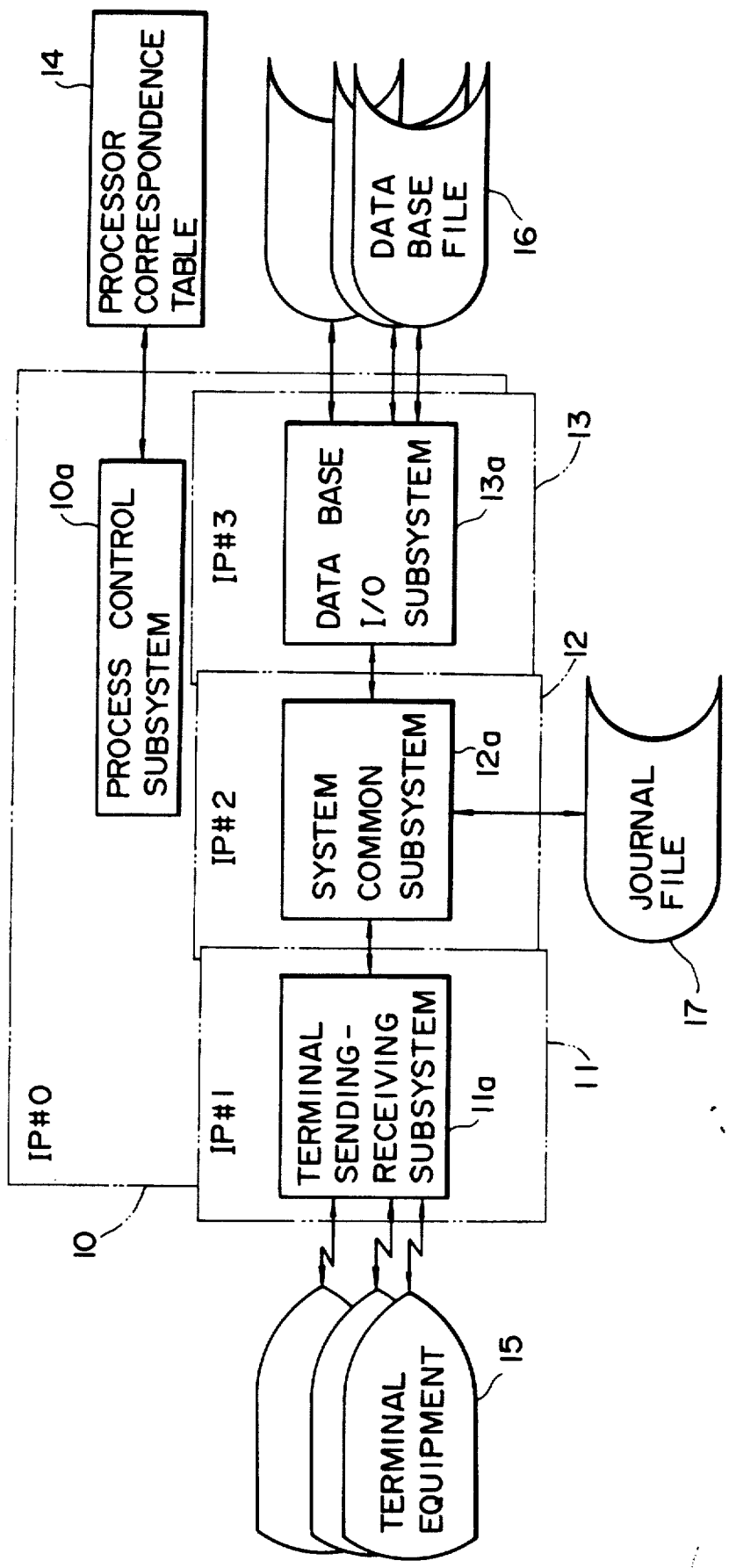
FIG. 1 is a block diagram illustrating the construction of an essential portion of a multiple processor system according to an embodiment of the present invention.

In FIG. 1, reference numerals 10, 11, 12 and 13 designate instruction processors operating as processing elements in the multiple processor system, 14 designates a processor correspondence table 15 identifies terminal equipment, 16 represents a data base file, 17 identifies a journal file, 10a identifies a process control subsystem, 11a identifies a terminal sending-receiving subsystem, 12a identifies a system common subsystem, and 13a identifies a data base I/O subsystem. The multiple processor system as shown in FIG. 1 is a system comprising four interconnected instruction processors IP#0, IP#1, IP#2 and IP#3. FIG. 1 briefly illustrates blocks obtained by breaking down the system configuration into processing function units (subsystem) when the multiple processor system is used as an on-line data base system. In this example, the system configuration is constructed as a DB (Data Base)/DC (Data Communication) system.

As shown in FIG. 1, the DB/DC system is provided with a terminal sending-receiving subsystem 11a, a system common subsystem 12a, and a data base input-output subsystem 13a as processing units in order to operate the system. In order to realize the function of each of the processing units, a process for each processing unit required by the corresponding function of the respective processor unit is generated as a subsystem as follows:

(1) DC subsystem for performing sending-receiving processing to the terminal;
(2) DB subsystem for performing input-output processing of data base; and
(3) system common subsystem function such as journal saving processing and so on.

In other words, the system is operated by generating the above subsystems for the three processing functions as described hereinabove. The processes of these subsystems may be executed by any instruction processor in a multiple processor environment composed of a plurality of instruction processors. In the system according to this embodiment, there is provided a processor correspondence table 14 in which is stored the correspondence between each of the subsystems and the instruction processor executing the respective subsystem. A process control subsystem 10a for implementing control of the processing transfers the processing control to the instruction processor specified at the time of execution of the subsystem with reference to the correspondence between the subsystem and the processor as stored in the processor correspondence table 14.

FIG. 2 is a block diagram illustrating the system configuration of the essential portion of the multiple processor system according to another embodiment of the present invention. In the embodiment as shown in FIG. 2, in order to efficiently operate the DB/DC system in the environment of a multiple processor system, the entire system is divided into a plurality of subsystems 21a, 21b and 22a, 22b and 23a, 23b for example, in correspondence to a plurality of input-output resources to be connected to the multiple processor system, such as terminal equipment 25a, 25b, 25c and data base files 26a, 26b, 26c, respectively. Each of the subsystems relates to one of a plurality of instruction processors (IPs), IP0, IP1, . . . , IPn, consisting of elements structuring the multiple processor system. This correspondence is performed by specifying a correspondence in the processor correspondence table 14. This correspondence varies with units of subsystems divided and the number of instruction processors. For example, in the case of the system wherein one subsystem corresponds to one instruction processor, the one subsystem is executed only by the one instruction processor so that no conflict between input-output resources of the subsystem may arise between plural instruction processors.

As an alternative example of dividing the system into plural subsystems, the system configuration may be such that, as shown in FIG. 2, a terminal sending-receiving subsystem (DC subsystem) 21a is disposed in a pair with a data base input-output subsystem (DB subsystem) 21b, thereby producing a DB/DC subsystem so as to correspond to one instruction processor 21 in instances where a particular terminal equipment is closely associated with a particular data base file like an on-line system of a bank. The advantage of this system configuration resides in the fact that the overhead of processing communication can be reduced between the instruction processors to be used by execution of the transaction processing in executing a DB search and update processing from the terminal equipment. This improves processing throughput and system performance.

In operation of such multiple processor system, description will be made of the method of dividing the system into subsystems and the method of specifying correspondence between the subsystems divided and each of the instruction processors in performing the data processing.

FIGS. 3a, 3b, 3c, 3d, 3e and 3f are views illustrating typical embodiments for operating the system by dividing the process in the multiple processor system into subsystems. The correspondence of the process of each function unit to each instruction processor of the multiple processor system may be based on the system configuration, for example, as shown in FIGS. 3a, 3b, 3c, 3d, 3e and 3f.

The way of dividing the data processing into processes for each unit processing in the system executing a series of data processing operations is such that one system is divided into a DC subsystem for managing resources of a line unit and a terminal unit, and a DB subsystem for managing resources of a data base system. The DC subsystem and the DB subsystem may be divided by a management unit of each resource into subsystems which are smaller in processing unit.

When the subsystems as divided are assigned to instruction processors, there may be configurations as follows:

(1A) configuration in which a DB subsystem group is assigned to one instruction processor;

(1B) configuration in which a DB subsystem group is assigned to another instruction processor for each DB subsystem;

(1C) configuration in which a DB subsystem group is assigned to plural instruction processors as a whole;

(2A) configuration in which a DC subsystem group is assigned to one instruction processor;

(2B) configuration in which a DC subsystem group is assigned to another instruction processor for each DC subsystem;

(2C) configuration in which a DC subsystem group is assigned to plural instruction processors as a whole;

(3A) configuration in which a DB subsystem and a DC subsystem coexist on one instruction processor;

(3B) configuration in which a DB subsystem and a DC subsystem group are separated from each other so as not to coexist on one instruction processors.

FIGS. 3a, 3b, 3c, 3d, 3e and 3f show examples of the system configurations in which various types of the above configurations are taken into account. In these drawings, the block shown by a solid line represents a subsystem and the block shown by a two-dot-and-dash line represents an execution instruction processor (IP).

Figure 3A:
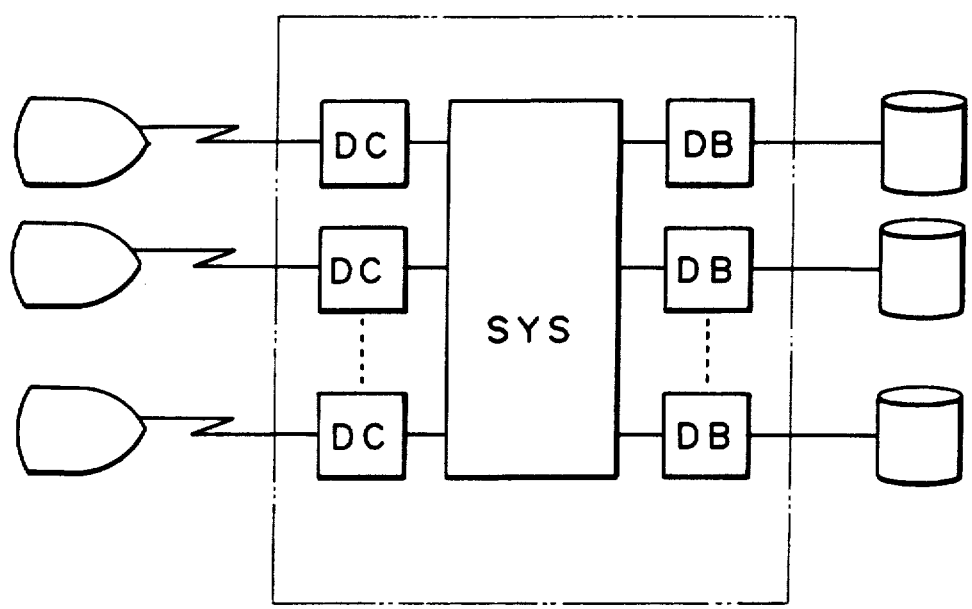
FIGS. 3a, 3b, 3c, 3d, 3e and 3f are views showing schematically typical embodiments in which the system is operated by dividing the datta processing process in the multiple processor system into subsystems.

FIG. 3a shows an example of a system configuration in which both the execution IP of the DB subsystem and the execution IP of the DC subsystem are formed by a single IP and the IP of the former is the same as that of the latter.

Figure 3B:
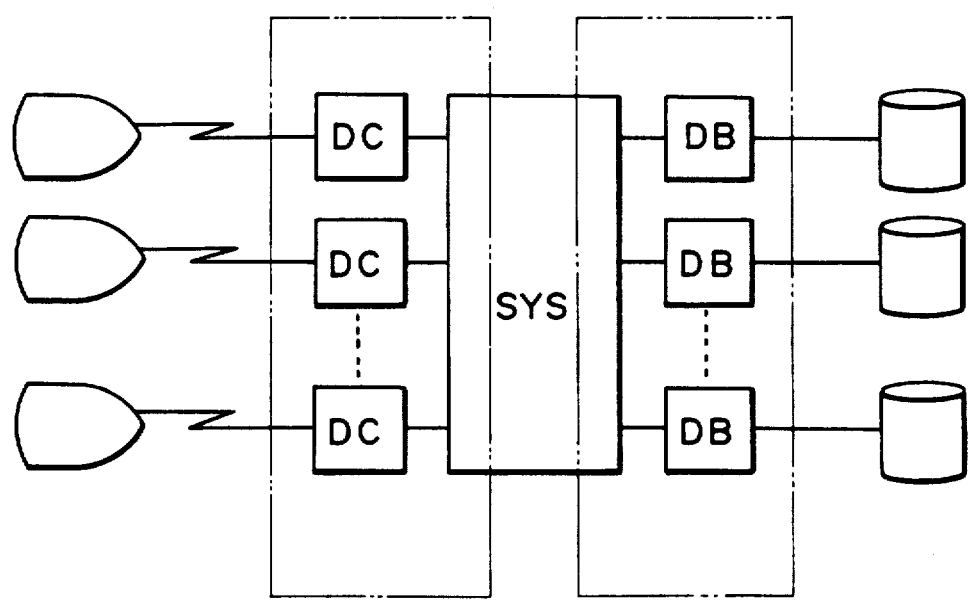

FIG. 3b indicates an example of a system configuration in which both the execution IP the DB subsystem and the execution IP of the DC subsystem are formed by a single IP and the IP of the former is different from that of the latter.

Figure 3C:
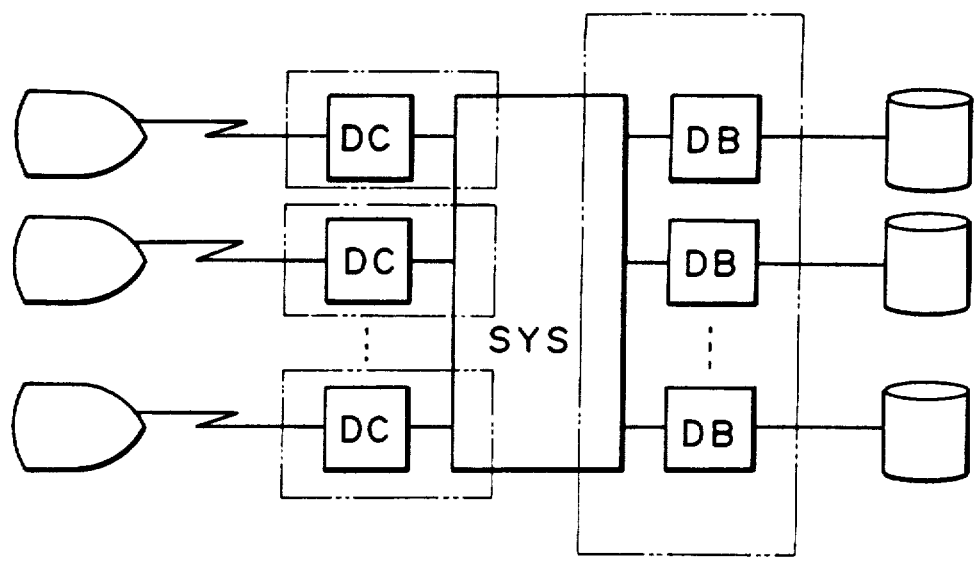

FIG. 3c indicates an example of a system configuration in which the execution IP of the DB subsystem is formed by a single IP, the execution IP of the DC subsystem is formed by plural IPs, and the IP of the former is different from those of the latter.

Figure 3D:
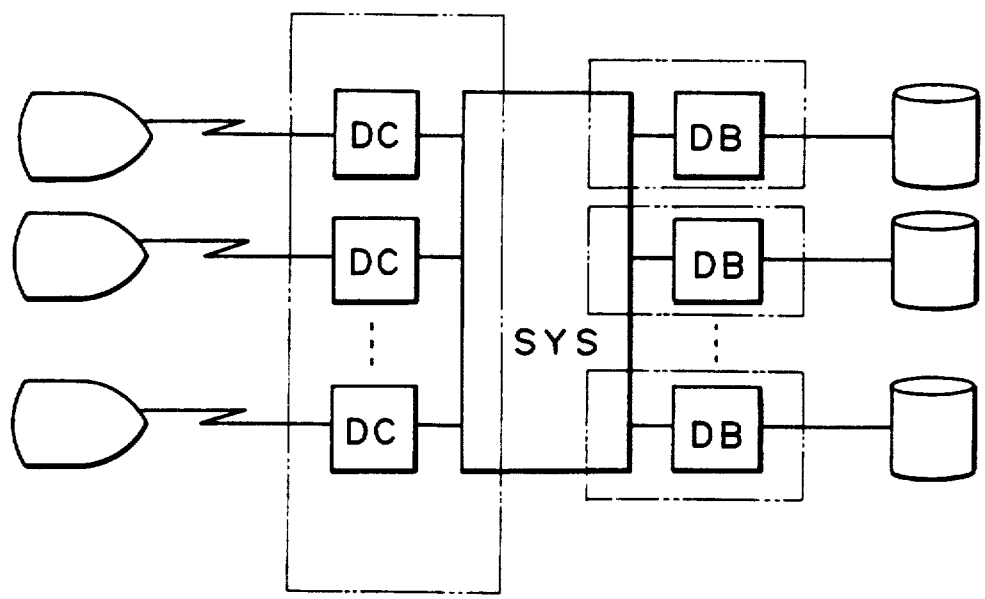

FIG. 3d indicates an example of a system configuration in which the execution IP of the DB subsystem is formed by plural IPs, the execution IP of the DC subsystem is formed by a single IP, and the IPs of the former are different from that of the latter.

Figure 3E:
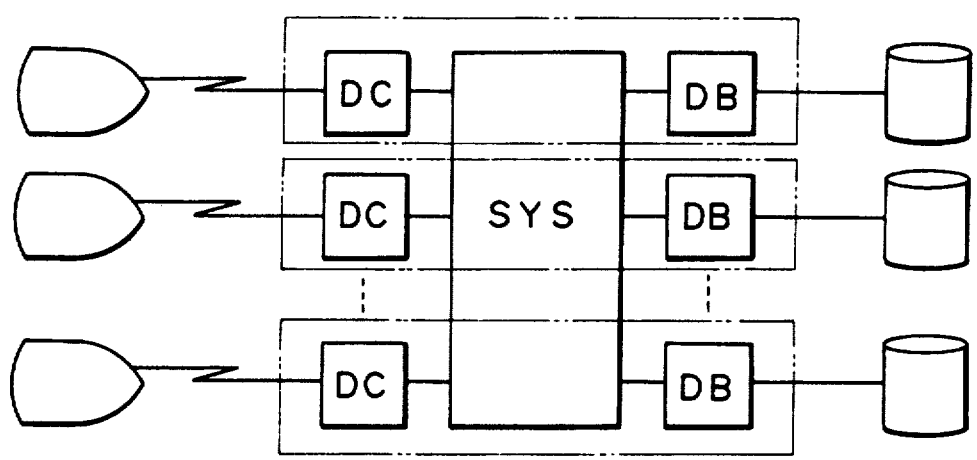

FIG. 3e indicates an example of system configuration in which both the execution IPs of the DB subsystem and the DC subsystem are formed by plural IPs and the IPs of the former and the latter are the same as each other.

Figure 3F:
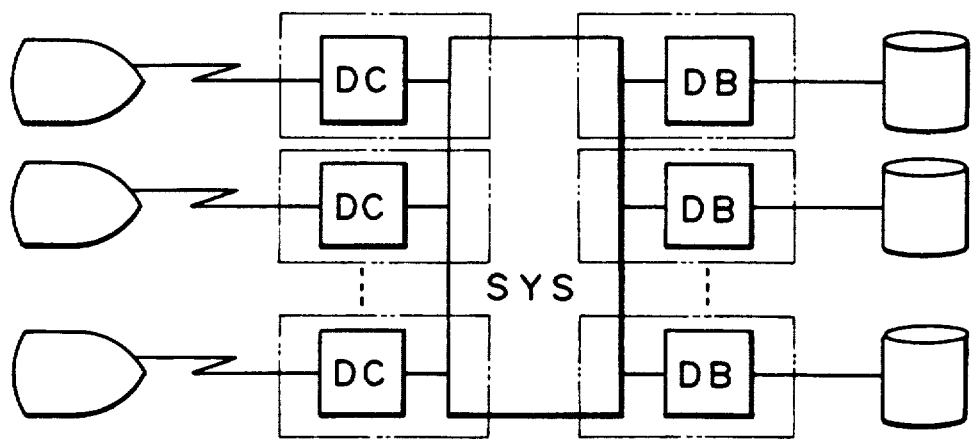

FIG. 3f indicates an example of a system configuration in which both the execution IPs of the DB subsystem and the DC subsystem are formed by plural IPs and the IPs of the former are different from those of the latter.

In those configurations, in instances where the subsystem group is assigned to one instruction processor, for example, as indicated in the configuration (1A) or (1B) above, the load of the subsystem group cannot be dispersed so that the range of application is narrow (FIG. 3a). When the subsystem group is assigned as a whole to plural instruction processors as indicated in the configuration (1C) or (2C), a conflict between resources among the plural instruction processors cannot be avoided (FIGS. 3b, 3c, 3d, 3f). Further, as indicated in the configuration (3B), in instances where the DB subsystem and the DC subsystem are assigned to different instruction processors, there may be the possibility that the overhead of communication between the instruction processors cannot be disregarded when the reprocessing is involved with a large number of DB accesses because communication between each of the instruction processors inevitably occurs due to mainly a query and answering state in which access is made from the terminal to the DB in an on-line system (FIGS. 3b, 3c, 3d, 3f). Therefore, as shown in FIG. 3e, the DC/DB subsystem of a standard type may be preferably provided with a system configuration in which the execution IPs of the DB subsystem and the DC subsystem are in an identical IP.

A series of operations of the DC subsystem and the DB subsystem will be described in conjunction with the system configuration as shown in FIG. 3e.

Figure 4A:
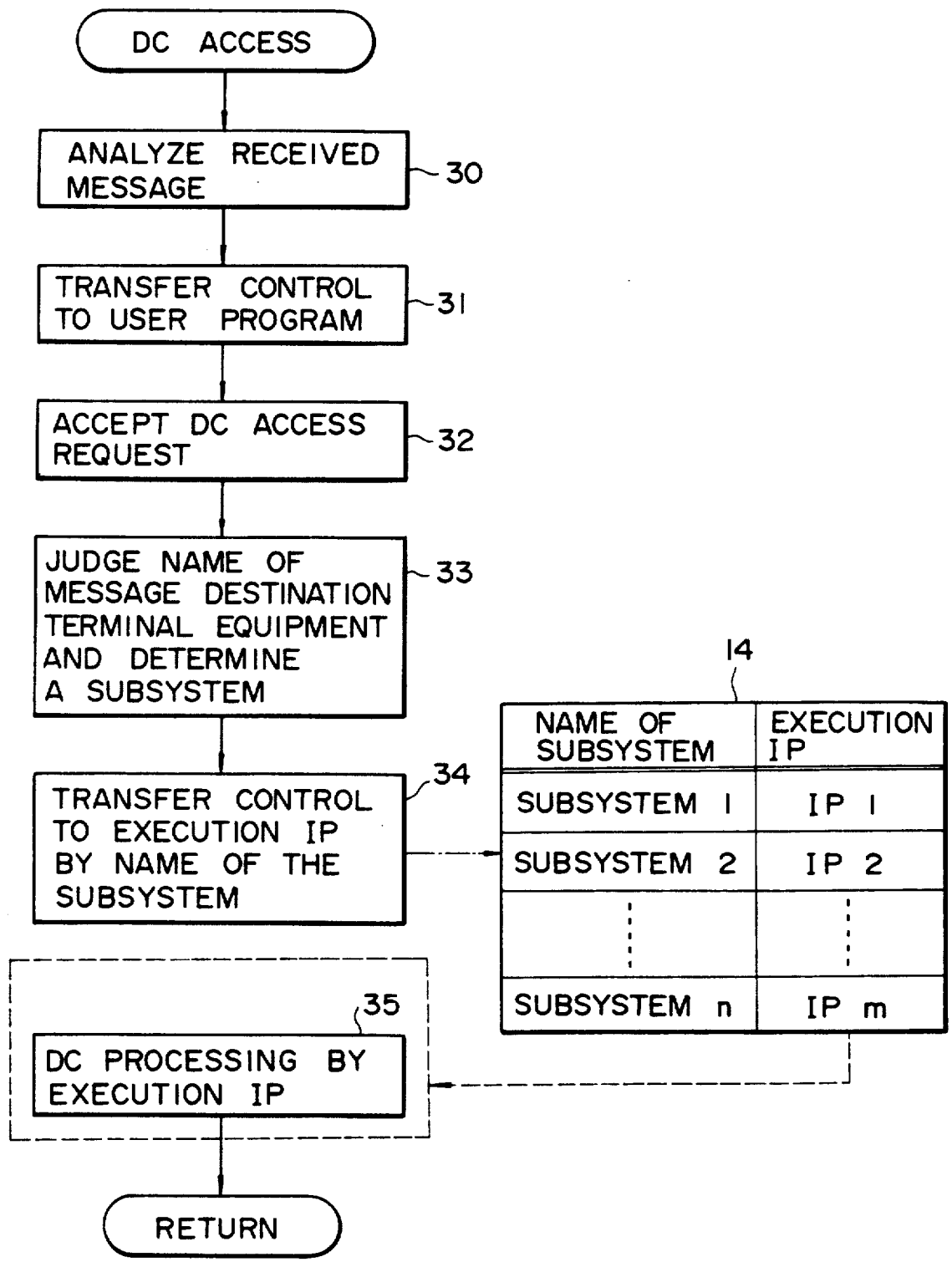
FIG. 4a is a flow chart showing briefly the DC (Data Communication) access processing flow of the DC subsystem.
Figure 4B:
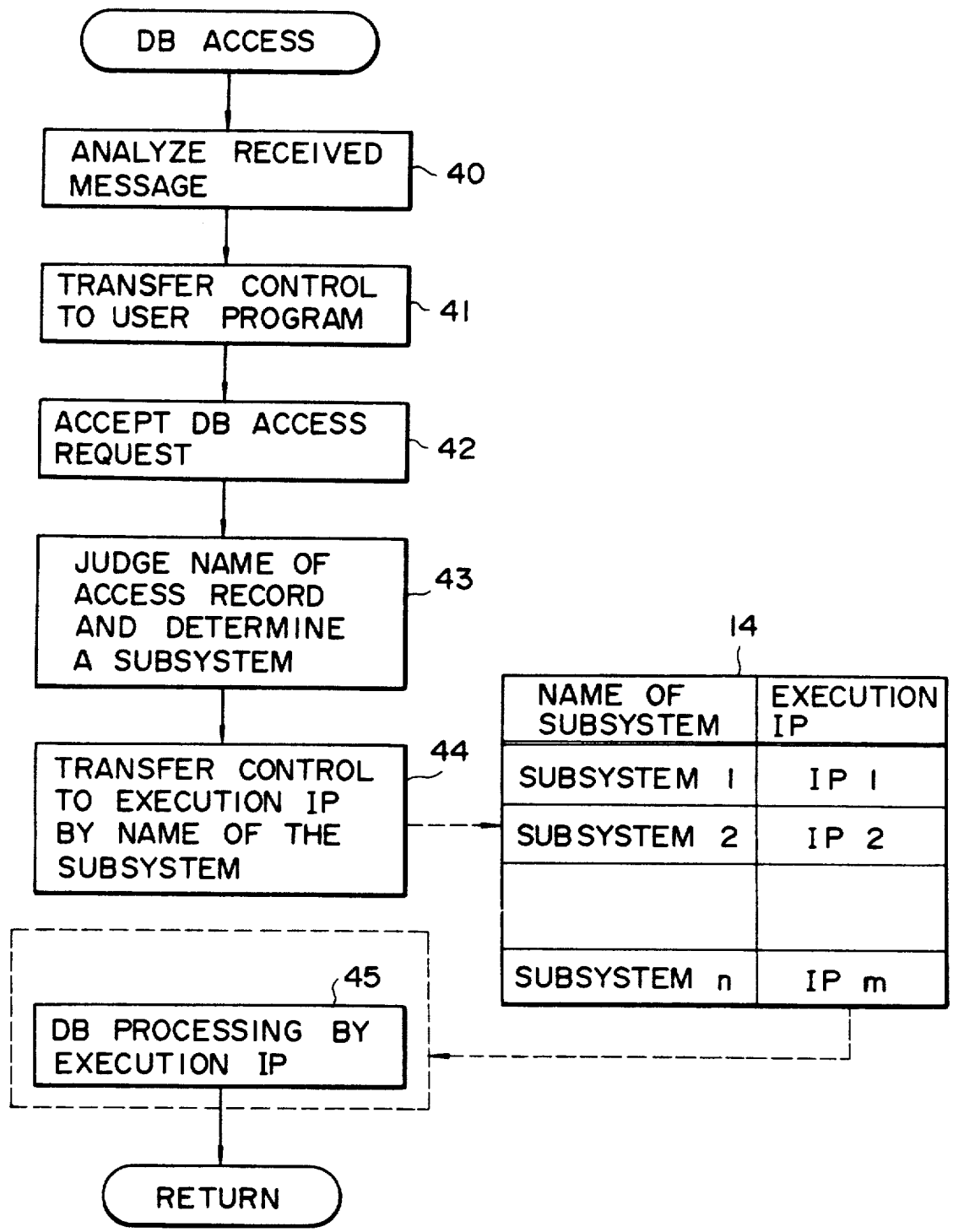
FIG. 4b is a flow chart showing briefly the DB (Data Base) access processing flow of the DB subsystem.
Figure 4C:
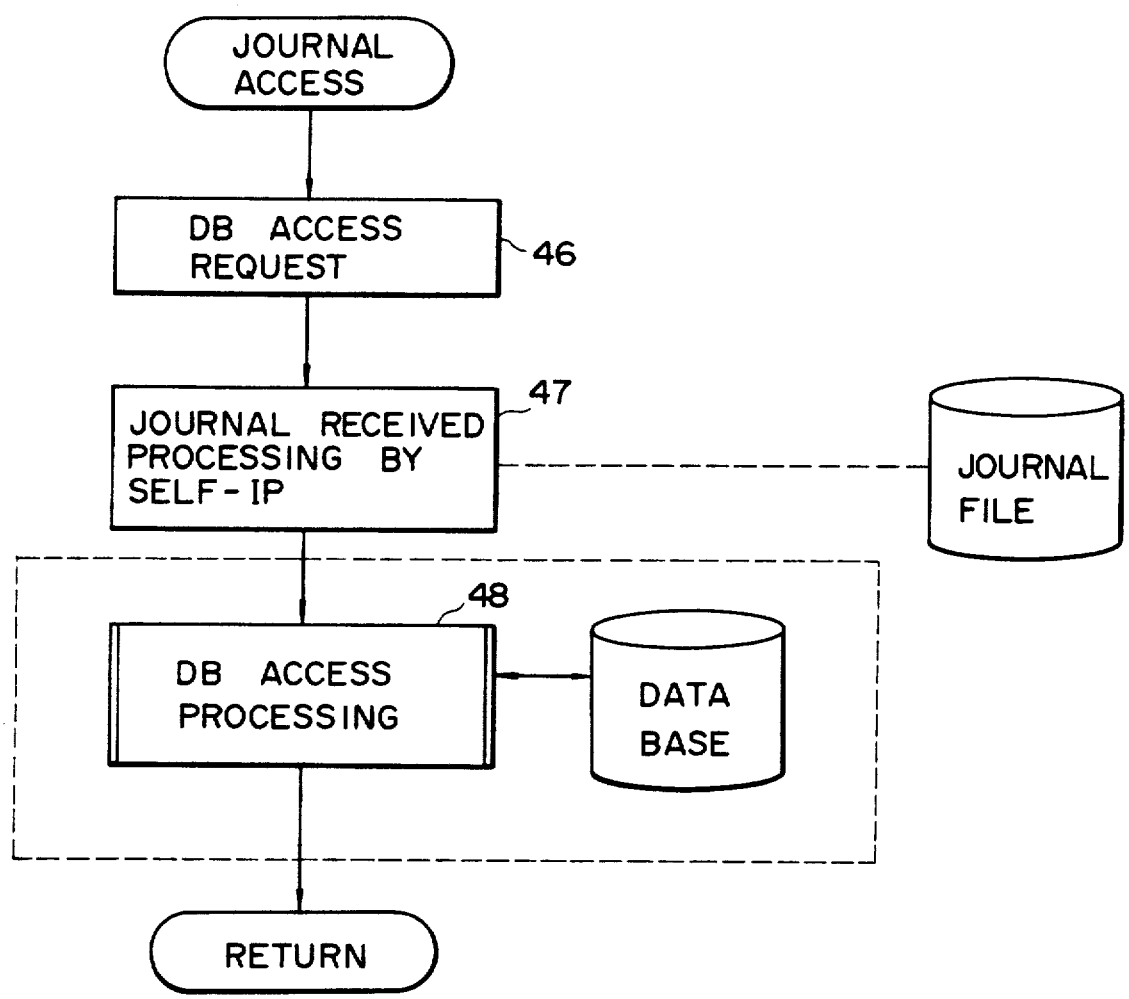
FIG. 4c is a flow chart showing the journal access processing flow accompanied with the DB update processing of the DB subsystem.

FIG. 4a is a flow chart indicating briefly the flow of the DC access processing of the DC subsystem. FIG. 4b is a flow chart indicating briefly the flow of the DB access processing of the DB subsystem. FIG. 4c is a flow chart indicating the processing flow of the journal access processing accompanied by the DB update processing of the DB subsystem.

Description will be made on the DC access processing of the DC subsystem with reference to FIG. 4a. In the DC access processing, when a message is received from a terminal, the message received is analyzed at step 30. Then at step 31, control is transferred to a user program of concern according to the analysis content. Thereafter, at step 32, the DC access request is accepted from the user program and, at step 33, the name of a message destination terminal equipment is judged and the subsystem is determined on the basis of a predetermined subsystem table. Then at step 34, control is transferred to the execution IP with reference to the processor correspondence table by the subsystem name determined and, at step 35, the DC processing is performed by the execution IP to which control is transferred.

The DC subsystem for managing the terminal of concern by the terminal correspondence subsystem table placed for all terminals in the system for each instruction processor is given from the name of the message destination terminal equipment to be designated in response to the DC access request of the user program. When the DC subsystem is determined, the IP with which to execute the DC access processing should be decided with reference to a relation between the subsystem of the processor corespondence table and the execution IP. If the IP given is the same as the IP that is currently in the process of execution of the processing, implementation of the processing is continued intact. If the IP which is currently executing the processing would be IP#1, for example, when the instruction processor to execute the DC access processing is IP#2, the execution IP is different so that an inherent demand is registered in the processing queue for the IP#2 and communication between the processors is effected in order to transfer the processing to the IP#2. Upon receipt of the processor-to-processor communication, the IP#2 pulls out a DC access request from the processing queue, thereby performing the DC access processing. After the DC access processing, the IP#2 registers an inherent request of the processing in the processing queue of the requestor IP#1 to thereby perform a processor-to-processor communication to the IP#1.

Description will then be made of the DB access processing of the DB subsystem with reference to FIG. 4b. In the DB access processing, a received message is analyzed at step 40 and control is transferred to a user program of concern in accordance with the analyzed content at step 41. Then at step 42, the DB access request is accepted from the user program and, at step 43, the access record name is judged and a predetermined subsystem is determined in accordance with a subsystem table separately set. Thereafter, at step 44, control is transferred to the execution IP with reference to the processor correspondence table using the name of the subsystem decided. The DB processing is performed in the execution IP which control is transferred at step 45.

In other words, in the DB access processing, the DB to be accessed upon the DB access request of concern is determined from the name of the record designated by the DB access request of the user program, using a subschema (DB access specification) corresponding to the user program in each IP. If the DB to be accessed is determined, the DB subsystem managing the accessing DB is given by the DB subsystem correspondence table of a processing control table having all DBs in the system for each IP. When the DB subsystem is given, which IP is used to execute the DB access processing at this stage by the processor correspondence table is determined. If the IP determined is the same as the IP which is currently executing the processing, the processing continues as it is. If the IP determined is different from the IP executing the current processing, the inherent request of the processing is registered in the processing queue of the IP (IP#2 determined) to be executed and a processor-to-processor communication is made for the IP#2 determined. This processing allows the IP#2 which has received the processor-to-processor communication to draw the DB access request from the processing queue and execute the DB access processing. After completion of the DB access processing, the IP#2 registers the processing inherent request in the processing queue of the requestor IP (IP#1) to make a processor-to-processor communication to the IP#1.

As shown in FIG. 4c, description will be made of the journal access processing accompanied by the DB update processing of the DB subsystem. The journal access processing requires a common management by the system from the character of journal files so that it does not particularly specify the IP performing the processing. This IP can continuously perform the journal access processing without changing the execution IP in the IP in the process of executing the current processing. More specifically, as shown in FIG. 4c, the DB access request for the DB alteration processing is first accepted at step 46 and the journal-received processing is performed by the self-IP at step 47 without changing the IP executing the processing, thereby generating journal files. At step 48, the DB access processing as shown in FIG. 4b is performed to update the DB.

Figure 5A:
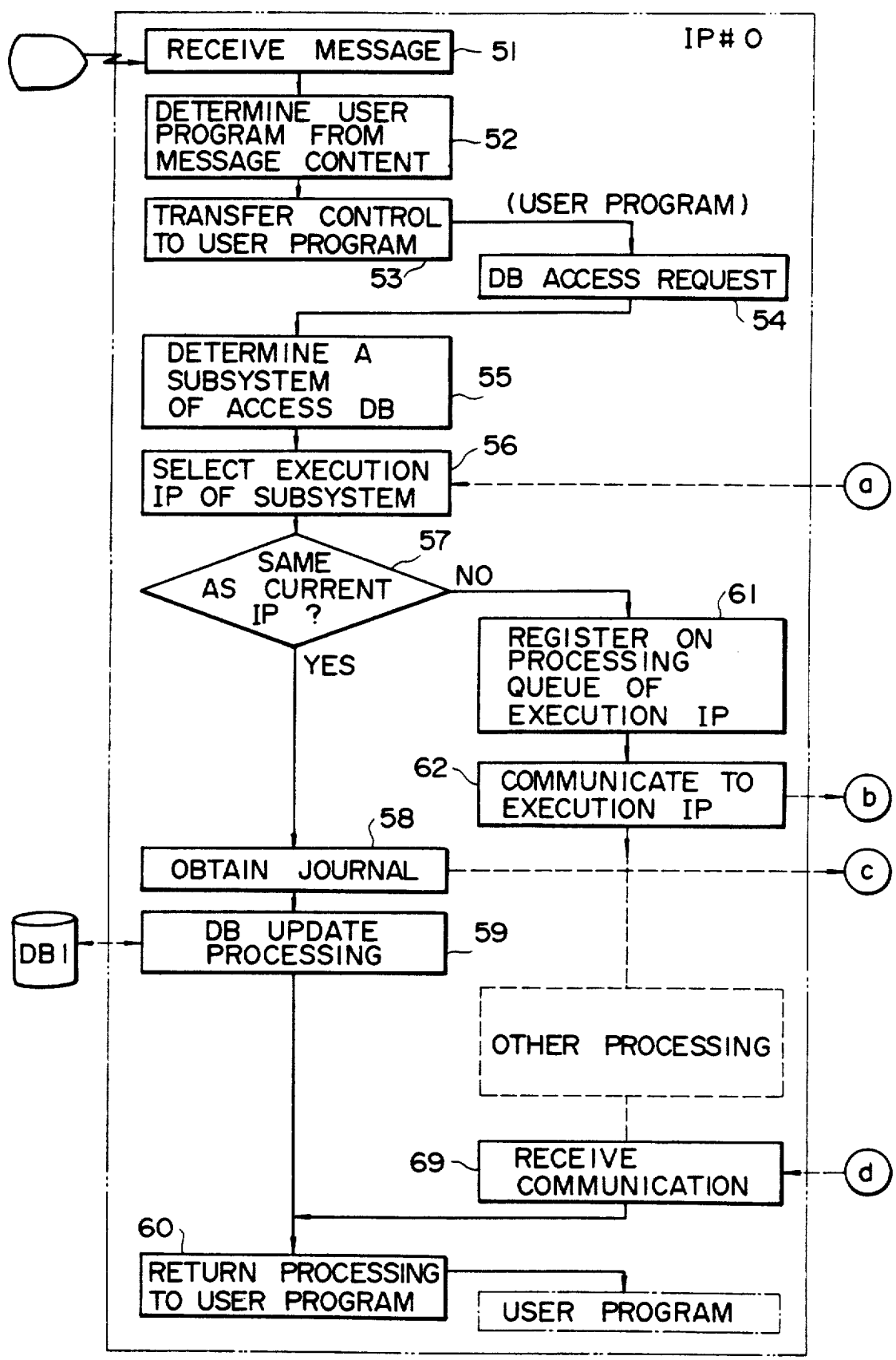
FIG. 5 (FIG. 5a and FIG. 5b) is a flow chart showing a series of overall operation for the DB update processing by altering the instruction processors executing the processing.

FIG. 5 (FIGS. 5a and 5b) illustrates a flow chart indicating a series of overall operations for performing the DB update processing after changing the instruction processor executing the processing.

After a series of processing operations of the DC subsystem has been finished, the data base update processing is performed by implementing the DB access in the DB subsystem.

In the process of the DB subsystem, a message is received at step 51 and the user program is determined from the content of the message at step 52. At step 53, control of the processing is transferred to the user program. In the user program, as the DB access requested is issued at step 54, the processing at step 55 is performed to determine a subsystem for processing the access DB. In other words, the DB to be accessed is determined from the access record name to be designated by the DB access request using a subschema which each of the instruction processors have so as to correspond to the user program, and there is then given the DB subsystem for managing the access DB by the DB subsystem correspondence table having all DB from access DB within the system for each IP.

Then at step 56, the IP is selected which executes the determined DB subsystem with reference to the processor correspondence table 14. More specifically, when the DB subsystem is determined, the IP executing the DB access processing is given by referencing the table 14 specifying the correspondence between the subsystem and the execution IP. Thereafter, at step 57, it is judged whether the given IP is the same as the IP which is currently in the process of execution. If the IP is the same, the processing is continued as it is and the processing for obtaining the journal is performed at step 58. The flow then proceeds to step 59 and the DB update processing is performed. At step 60, the system is returned to the user program.

If it is decided at step 57 that the given IP is different from the IP which is currently executing the process, the flow proceeds to step 61 where the inherent processing is registered in the processing queue of the given IP. Then at step 62, the procesing is performed for the processor-to-processor communication for communication to the execution IP (IP#1) while the IP#0 performs the other processing.

In the processing at step 63, as the IP#1 receives the communication from the IP#0, the DB access request is pulled out from the processing queue of the self-IP to perform the DB update processing. At step 65, the journal obtained processing is performed and, at step 66, the DB update processing is performed. As a conclusion of the DB update processing at step 66, the flow advances to step 67 where the inherent request for the processing is registered in the queue of the requestor IP (IP#0), and the processing for the processor-to-processor communication is performed in order to make communication with the requestor IP.

The IP#0 which has been performing the other processing implements the processing for receiving communication at step 69. Then the flow is returned to step 60 and the system is returned to the user program.

The present invention has specifically been described with reference to the above embodiments and it is to be understood that the invention is not intended to be restrictive thereto in any respect and that it encompasses any variations and modifications with the scope and spirit of the invention.

As has been described hereinabove, the multiple processor system according to the present invention generates divided subsystems in accordance with a processing unit of data processing and specifies the instruction processor executing the subsystem, thereby reducing the probability of causing a conflict against resources (memories) to a significant extent and consequently improving the throughput of the processing and the system performance.

More specifically, one data processing system is divided into plural subsystems corresponding to the input-output resources, and one subsystem is executed by one instruction processor only. In such a multiple processor environment, a conflict for resources between each of the instruction processors can be avoided, thereby improving the processing throughput and system performance.

Furthermore, in the subsystem which is designed such that the DC subsystem does not interfere with the DB subsystem, their coexistence in the same instruction processor can restrict the number of the instruction processors to be used for execution of the processing using both of the DB subsystem and the DC subsystem, thereby reducing the overhead of processing communication between the instruction processors. This arrangement can improve the throughput of the overall system processing and system performance.

What is claimed is:

1. A multiple processor system, comprising:
   a plurality of input/output resources;
   a plurality of instructions processors connected to said input/output resources, each instruction processor having at least one processing subsystem which performs a predetermined processing simultaneously with and in parallel to processing by other processing subsystems, each processing subsystem being assigned to access at least one input/output resource;
   means providing a processor correspondence table for indicating a correspondence between each processing subsystem and an instruction processor having said processing subsystem; and
   control processing means, coupled to said plurality of instruction processors and responsive to a request from one instruction processor for a particular processing subsystem to access an input/output resource assigned to that particular processing subsystem, for accessing said processor correspondence table and for transferring processing control from said one instruction processor to another instruction processor corresponding to said input/output resource as indicated by said processor correspondence table.

2. A multiple processor system as claimed in claim 1, wherein each processing subsystem is assigned to only one input/output resource, and wherein said control processing means includes means providing a subsystem correspondence table for indicating a correspondence between each processing subsystem and an input/output resource.

3. A multiple processor system as claimed in claim 1, wherein said input/output resources include terminal equipment and a data base file in an on-line data base system.

4. A multiple processor system as claimed in claim 3, wherein each instruction processor is connected to both a terminal equipment and a data base file and includes at least a pair of processing subsystems.

5. A multiple processor system as claimed in claim 4, wherein each processing subsystem is assigned to only one input/output resource.

6. A multiple processor system as claimed in claim 1, wherein said control processing means comprises an instruction processor having a common subsystem for controlling the processing control of other instruction processors on the basis of information provided in said processor correspondence table.

7. A method of data processing in a multiple processor system having a plurality of input/output resources and a plurality of instruction processors connected to said input/output resources for performing a processing including a plurality of unit processes which may be executed simultaneously and in parallel to each other, comprising the steps of:

providing in each instruction processor at least one processing subsystem for performing a predetermined unit process to access at least one input/output resource;

specifying in a processor correspondence table a correspondence between each processing subsystem and an instruction processor having said processing subsystem; and transferring processing control from one instruction processor, which produces a request for a particular processing subsystem to access an input/output resource assigned to that subsystem, to another instruction processor corresponding to said input/output resource, as indicated by said processor correspondence table.

8. A method as claimed in claim 7, wherein each processing subsystem is provided to access only one input/output resource, and further comprising providing a subsystem correspondence table for indicating a correspondence between each processing subsystem and an input/output resource.

* * * * *